2 Sheets—Sheet 1.

R. J. CLARK.
Combined Reaper, Thrasher, and Separator.

No. 222,772. Patented Dec. 23, 1879.

WITNESSES:
W. B. Wiley
Jacob Stauffer

INVENTOR
Robert J. Clark

ATTORNEY

N. PETERS, PHOTO-LITHOGRAPHER, WASHINGTON, D. C.

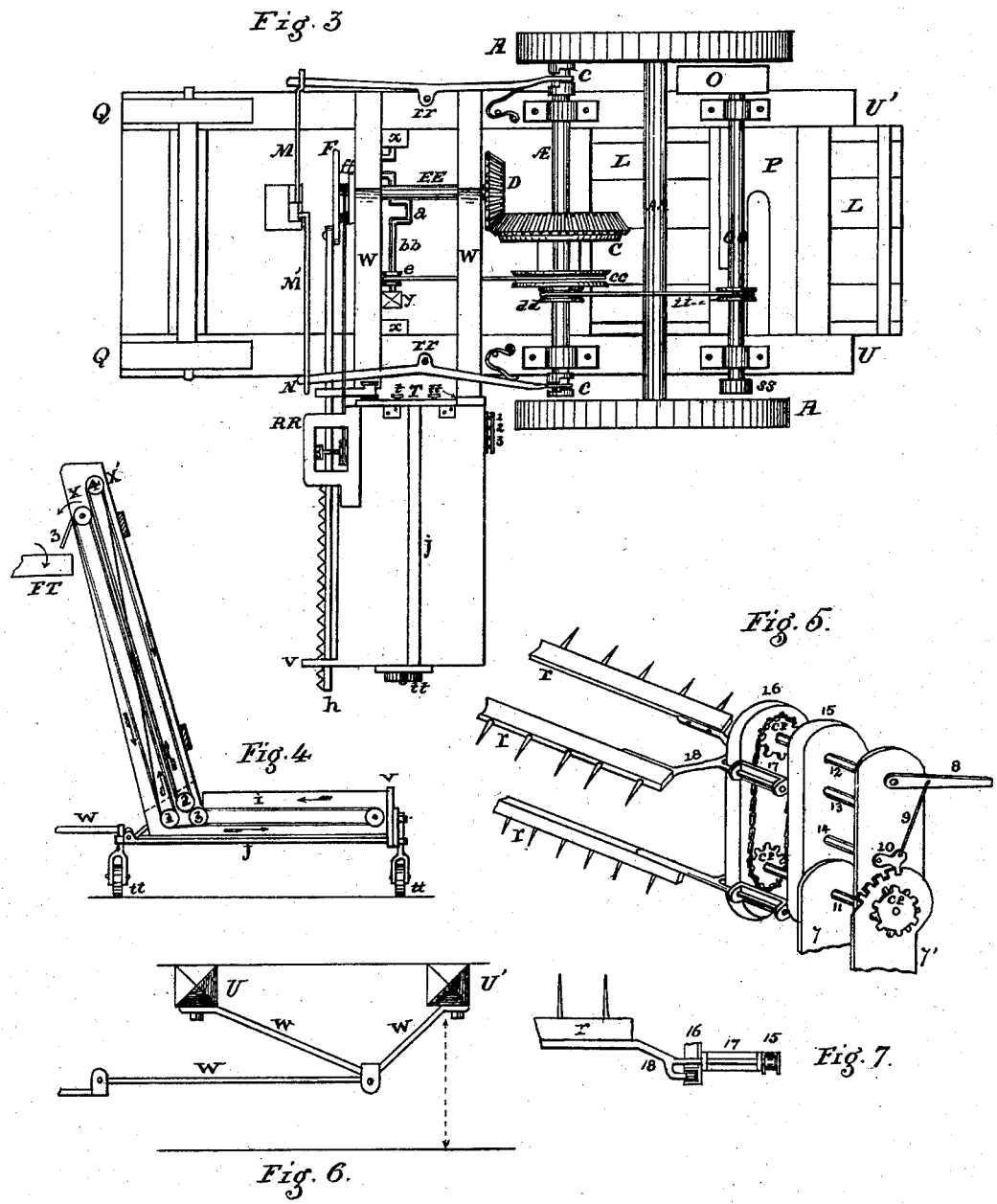

UNITED STATES PATENT OFFICE.

ROBERT J. CLARK, OF CHESTNUT LEVEL, ASSIGNOR TO HIMSELF AND JOHN C. RUTTER, OF SUMMIT HILL, PENNSYLVANIA.

IMPROVEMENT IN COMBINED REAPER, THRASHER, AND SEPARATOR.

Specification forming part of Letters Patent No. 222,772, dated December 23, 1879; application filed September 17, 1879.

*To all whom it may concern:*

Be it known that I, ROBERT J. CLARK, of Chestnut Level, in the county of Lancaster and State of Pennsylvania, have invented certain Improvements in the Combination of Reaper, Thrasher, and Separator, of which the following is a specification.

This invention relates to the construction and combination of a machine calculated to reap, thrash, clean, and separate the straw and deliver the grain into bags while in operation on the field, with devices for adjusting so as to adapt it to the irregular undulations of the soil, as herein more fully set forth.

The accompanying drawings, with the letters of reference marked thereon, and a brief explanation will enable those skilled in the art to make and use the same, in which—

Figure 1:
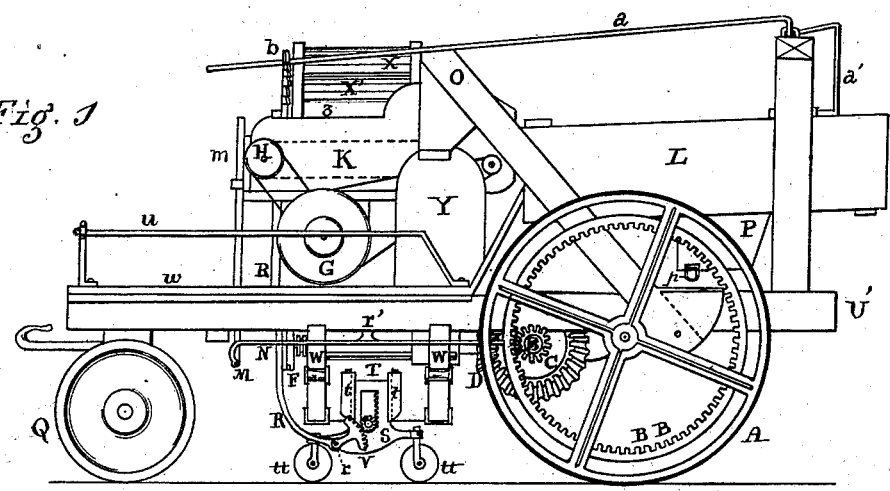
Figure 2:
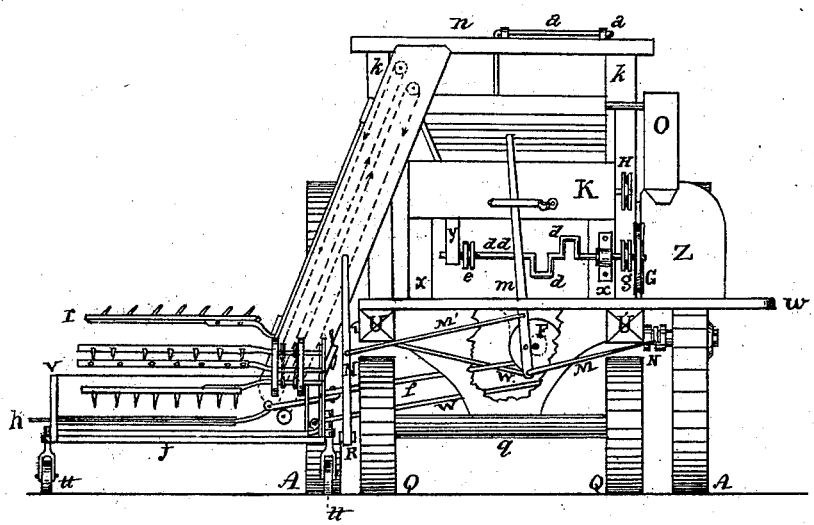

Sheet 1, Figure 1 shows one side of the combined reaper and thrasher and a portion of the opposite side of the inner end of the platform and casters. Fig. 2 is a front elevation, with portions cut away to show the combined levers in front and connecting-rods behind the forward truck. Sheet 2, Fig. 3 represents the under side, to show the general arrangement of the gear. Fig. 4 illustrates the traveling platform and endless conveying-canvas to carry the cut grain up and onto the traveling feed-table of the thrasher. Fig. 5 is an enlarged perspective view of the combined reel and rake attachment. Fig. 6 shows the manner of hinging the platform-truck and appliances to the main beams of the machine. Fig. 7 shows the supports of the several arms of the rake or reel, with anti-friction rollers in the several guideways for the same.

I may state that, while I contemplate embodying the most improved or desirable appliances in separate machines of this class of reapers, thrashers, and separators, whether of patents expired or by purchase, where distinct claimed portions are used not covered by the combination herein mentioned, I therefore do not deem it necessary to give any special description of fans, screens, shoes, &c., in common use, but to confine myself to my drawings illustrative of the general arrangement of gear and adjustable appliances to adapt the combined machines to operate in harmony on the field.

Fig. 1 shows a truck-frame, U', and ordinary driving-wheel A, with a cog-wheel, B B, attached to impart motion to the pinion B. The shaft of this pinion carries a bevel-wheel, C, a large pulley for chain or belt, $c$ $c'$, and a smaller one, $d$ $d$. These severally give motion to other gear.

The bevel-pinion D is in suitables boxes for its shaft E E, which carrries the crank-wheel F, to operate the cutter-bar by the ordinary pitman-connection. Also, behind F is a chain or strap pulley, $ff$, or shaft and gear, to drive the elevating canvas bands and the combined reel and rake before and over the cutters.

The larger pulley, $c$ $c$, on the driving-shaft gives motion by a belt or chain to the pulley $e$ on a double-crank shaft held in bearings in $x$ and $y$. These cranks give motion to the shoe, shaker, screens, &c., and the other to the fan, &c., of the separator parts. (Not shown.) The other or smaller pulley, $d$ $d$, on said driving-shaft gives motion, in like manner, to a pulley, $i$ $i$, on the cross-shaft $o$ $o$, which, by its end pulley, $s$ $s$, drives the elevators, one to carry the cleaned grain by dropping from a spout, $p$, from the receiver P into the open end of the elevator, and carrying it up into the hopper O, where it is received into bags clamped to the mouth of it.

Fenders Y and Z shelter the bags on the platform $w$, with its railing $u$, for the attendant and carrying of the filled bags. A valve-gate shuts the mouth of the hopper while a filled bag is removed to be replaced by an empty one. On the other side like provisions are made to convey the tailings to the thrasher-table, to be again subjected to the action of the cylinder.

The aforesaid double-crank shaft $d$ $d$, Fig. 2, drives the outer pulley, G, which gives motion to the pulley J to drive the thrashing-cylinder. Behind this larger pulley G there is a smaller one, $g$, which gives motion to the upper front pulley, H, to drive the endless or traveling feed-table to carry the straw and grain to the thrashing-cylinder, as it is delivered from between the endless carriers X' X, up from the traveling platform, upon which the grain falls as it is cut by the sickles.

In Figs. 1 and 3, L represents the ordinary straw and grain carrier and separator after passing between the concave and cylinder. This is hinged to the thrasher K at $l$, and by means of a rod, $a\ a'$, and rack $b$, or its equivalent—a chain, pawl, and windlass, connected with the attached separator—it can be adjusted to accommodate itself to the rise or fall of the ground on the field.

The ordinary shaker or straw-carrier $s\ c$ has lipped perforations, through which the thrashed material falls to a second or grain bottom. This bottom is provided with sharp raised metallic ridges, instead of being smooth, as in others, so as to confine the material more evenly dispersed and subjected to the blower, as otherwise on inclined ground they might slide to the lower side. Except the hinging the whole to the thrasher K and corrugating the grain-carrier, as mentioned, I claim no novelty. The blower, hangers, cranks, sieves, shoes, and appliances I do not claim.

The traveling platform $i$, operating-pulleys 1 2 3 4 6, and the endless canvas conveyers are illustrated, with the caster-wheels $t\ t$, by Fig. 4, Sheet 2, the whole hinged to the under side of the beams U' U of the machine by hangers W W, Fig. 6, while the slightly-inclined upright conveyer-frame of X' X is also hinged to the reaper truck or platform, the whole made adjustable by levers, so as to meet any ordinary inequalities of soil or standing grain. The inner face of this attached adjustment is shown in Fig. 1.

S shows a yoke with a caster-wheel on each end. This yoke has a central elevated open frame, which has rack-teeth on one of its inner edges, and made to slide in side guides or keepers, $t$, on a fixed plate, T, united to the truck or platform. There is a similar rack and guides on the other or outer end of said platform, with a single caster, $t\ t$, a pinion on each end of a shaft, $j$, extending from one rack to the other, and in which they operate.

To raise the platform uniformly at both ends, a lever, R, is employed, hinged to the yoke S, and having a chain-connection or a segmental rack, V, at its end, which has the proper radius or curve to actuate the pinions of the platform and cause them to travel upward or downward in raising or lowering the said platform, as the resistance of the ground on the truck-wheels impels the platform to rise or fall with its attached pinions at each end.

The combined reel and rake is shown in perspective by Fig. 5. (Details shown by Fig. 7.) The two standards shown by Fig. 7 support the combined reel and rake head, which is adjustable on the driving-shaft 11 as a pivot of motion. The circular head of 7' is notched for a pawl, 10. This pawl is connected by a rod, 9, with a lever, 8, so as to be convenient to hand, and by which the reel or rake can be more or less inclined forward for adjustment. 18 shows a chain-pulley to give motion to the rake-arms by means of a pair of chain wheels or pulleys on said shaft between the guide-plates 15 16. A similar pair of chain-pulleys are on the upper shaft, 12. These plates are united by the cross-pieces 13 and 14. An endless chain connects the upper and lower pairs of pulleys, C P, cross-plates 17, Fig. 7, having end bearings for the projecting rake-rod 18, which plates sit upon and are affixed to the chains at four regularly spaced points, and carry the rake-shafts with them. Friction-rollers are on the inner end and branch end, to traverse in a groove under the guide and plates or rims of the same, 15 and 16.

I surround the forward portion of the driving-shaft 11 with a fixed sleeve, on the outer end of which I form a tilting-lug to actuate the rake-rod, when over the cutter-bar, to tilt the teeth when clear of grain, to prevent any tendency to tangle the cut grain lodged on the platform.

Without going into minor details of parts well known and common in reapers, thrashers, and separators of various forms, combined or detached with thrashing-machines, or clutch, rod, and lever to put in or out of gear, I confine myself mainly to the general construction and arrangement, the operation of which will be readily understood by the description herein given. Therefore

What I claim as my invention is—

1. In combination with the casters $t\ t$, that support the platform, the yoke S, with its central sliding rack-frame, its grooved guide-plates $t$ on the fixed end plate, T, the lever R, connected at $r$ to the yoke, and provided at its end with a segmental rack, V, or its equivalent, to actuate pinions on a shaft, $j$, extending across under the platform to the outer end to a like sliding rack operated simultaneously by a similar pinion by the resistance of the ground, causing the platform to rise up or for adjustment up or down, together with the aforesaid conveyers hinged to it, the whole jointly connected with the beams U' U of the machine by the hinged hangers or braces W W, substantially as and for the purpose specified.

2. The combination of the compound rake and reel head with its arms $r$, supporting rake-rods 18, held in bearing-plates 17, having anti-friction balls, as also on the end of a branch which enters a grooved traverse-way under the upper plates, 15 and 16, said bearing-plates 17 being connected with chains, which are made to revolve by chain-pulleys C P, the adjusting-lever 8, pawl-connection 9 10, and notched circular head of the standard, 7', substantially as and for the purpose set forth.

ROBERT J. CLARK.

Witnesses:
W. B. WILEY,
JACOB STAUFFER.